United States Patent [19]

Hatamura et al.

[11] Patent Number: 4,702,207
[45] Date of Patent: Oct. 27, 1987

[54] INTAKE ARRANGEMENT FOR INTERNAL COMBUSTION ENGINE

[75] Inventors: Koichi Hatamura; Koji Asanomi, both of Hiroshima, Japan

[73] Assignee: Mazda Motor Corporation, Hiroshima, Japan

[21] Appl. No.: 815,288

[22] Filed: Dec. 27, 1985

Related U.S. Application Data

[63] Continuation of Ser. No. 653,766, Sep. 24, 1984, abandoned.

[30] Foreign Application Priority Data

Sep. 24, 1983 [JP] Japan ................... 58-176776
Oct. 28, 1983 [JP] Japan ................... 58-202047

[51] Int. Cl.$^4$ .............................................. F02B 3/00
[52] U.S. Cl. ........................................ 123/302; 123/308
[58] Field of Search ........ 123/26, 302, 52 M, 52 MC, 123/306, 308, 432, 585

[56] References Cited

U.S. PATENT DOCUMENTS

| 1,896,163 | 2/1933 | Champion | 123/315 |
| 3,408,992 | 11/1968 | von Seggern et al. | 123/188 M |
| 3,911,873 | 10/1975 | Dave | 123/432 |
| 4,300,504 | 11/1981 | Tezuka | 123/432 |
| 4,315,492 | 2/1982 | Takeda | 123/445 |
| 4,354,463 | 10/1982 | Otani et al. | 123/308 |
| 4,362,132 | 12/1982 | Neuman | |
| 4,469,067 | 9/1984 | Futakuchi | 123/432 |
| 4,494,504 | 1/1985 | Yagi et al. | 123/308 |

FOREIGN PATENT DOCUMENTS

| 0150516 | 11/1979 | Japan | 123/308 |
| 0064115 | 5/1980 | Japan | 123/432 |
| 0018023 | 2/1981 | Japan | 123/306 |
| 0070914 | 5/1982 | Japan | 123/306 |
| 0093626 | 6/1982 | Japan | 123/661 |
| 57-137617 | 8/1982 | Japan . | |
| 0023220 | 2/1983 | Japan | 123/432 |
| 57-57022 | 4/1983 | Japan . | |
| 0135321 | 8/1983 | Japan | 123/432 |
| 2087480 | 5/1982 | United Kingdom . | |

OTHER PUBLICATIONS

Patents Abstracts of Japan, vol. 6 No. 240 (M-174) [1118] JP-A-57-137, 617, 11/82 (Toyota Jidosha Kogyo K.K.).

Primary Examiner—Tony M. Argenbright
Assistant Examiner—David A. Okonsky
Attorney, Agent, or Firm—Burns, Doane, Swecker & Mathis

[57] ABSTRACT

An intake arrangement for an internal combustion engine provided with a intake construction capable of generating a swirl effective for improving combustibility within a combustion chamber during low load operating conditions of the engine, without substantially altering a two intake port system aiming at a high output of the engine.

16 Claims, 8 Drawing Figures

Fig. 4
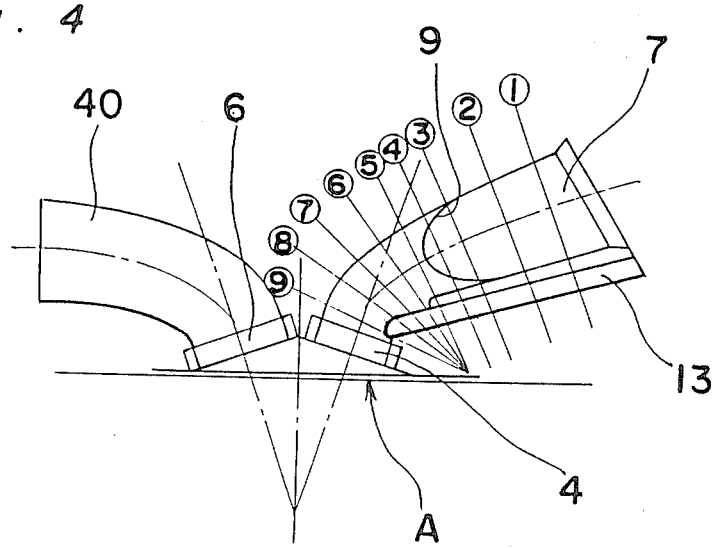
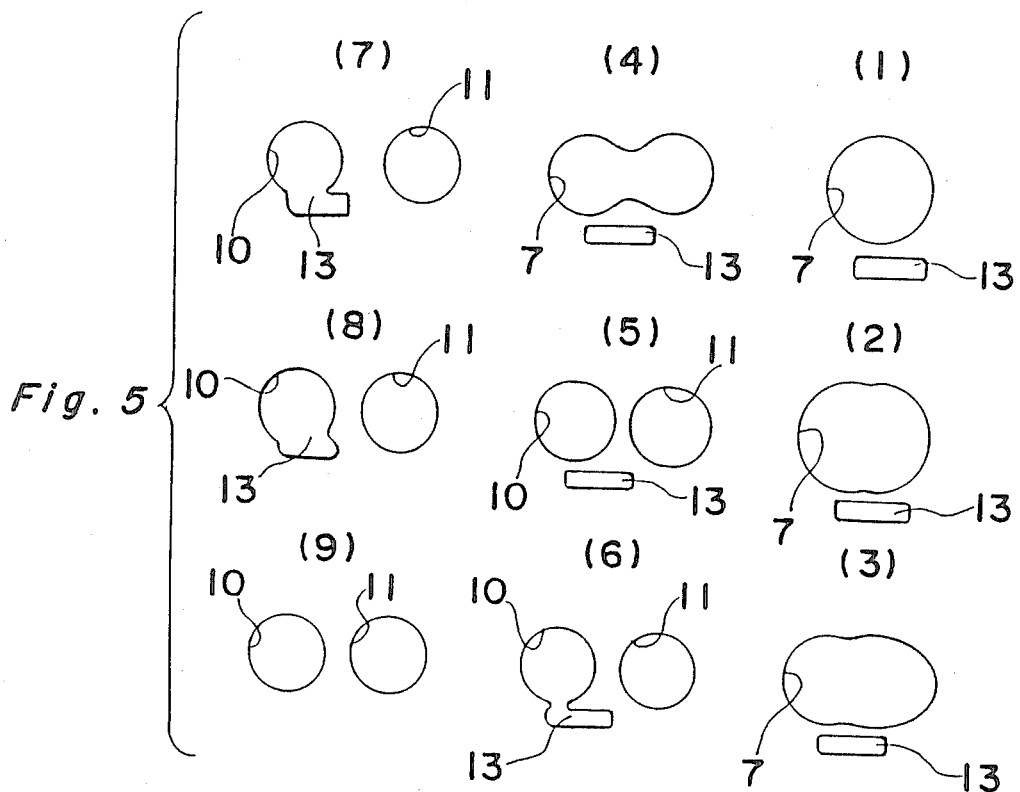
Fig. 5

INTAKE ARRANGEMENT FOR INTERNAL COMBUSTION ENGINE

This is a continuation of application Ser. No. 653,766, filed Sept. 24, 1984, and now abandoned.

BACKGROUND OF THE INVENTION

The present invention generally relates to an internal combustion engine (hereinbelow, referred to as an "engine") and more particularly, to an intake arrangement for the engine, in which a combustion chamber of each of the cylinders is provided with a plurality of, for example, two intake ports each having an intake valve for opening or closing each of the intake ports such that at least one of the intake ports is selectively used in accordance with a load applied to the engine.

Conventionally, in intake arrangements for reciprocating engines equipped with a plurality of cylinders each having a combustion chamber and a cylinder head, it is known that two intake ports having a substantially identical bore area are provided on the combustion chamber so as to secure a large intake area and an intake passage formed in the cylinder head is connected to the intake ports at a small angle with an axis of the combustion chamber so as to cause intake gases to flow into the combustion chamber substantially along the axis of the combustion chamber such that the engines can yield high outputs by maximizing charging efficiencies of the engines. The above-known two-port type intake arrangements are advantageous in that it becomes possible to obtain high outputs from the engines under high load engine operating conditions, but have such inconveniences that low flow velocity of the intake gases, inferior combustibility of an air-fuel mixture, uneconomical fuel consumption and an increase of harmful compositions in the exhaust gas are incurred under low load engine operating conditions.

In order to eliminate the above described drawbacks, Japanese Patent Laid-Open Publication No. 44419/1981 (Tokkaisho 56-44419), for example, discloses an intake arrangement for an engine, in which a first branch intake passage (for low loads) and a second branch intake passage (for high loads) provided with a shutter valve are led from a main intake passage so as to be, respectively, connected to two intake ports formed on the cylinder head and the shutter valve of the second branch intake passage is closed under the low load engine operating conditions such that intake is performed by using only the first branch intake passage. More specifically, the main intake passage is provided with a throttle valve and the throttle valve is operatively associated with the shutter valve such that the shutter valve is opened upon opening of the throttle valve beyond a predetermined opening degree. Namely, under the low load engine operating conditions, since the second branch intake passage is closed by the shutter valve, the intake gases are supplied at a relatively high flow velocity through only the first branch intake passage. Meanwhile, under the high load engine operating conditions, since the intake gases are supplied through both the first and second branch intake passages, a large charging amount of the intake gases can be secured.

However, since this prior art intake arrangement is originally designed to secure a sufficiently large amount of the intake gases under the high load engine operating conditions, each of the first and second branch intake passages has a rather large cross-sectional area. Accordingly, even if only the first branch intake passage is used under the low load engine operating conditions, it is impossible to increase a flow velocity of the intake gases sufficiently under such extremely low load engine operating conditions as idling, so that it becomes impossible to effectively produce swirling motions of an air-fuel mixture in the combustion chamber, which swirling motions are indispensable for improvement of combustibility of the air-fuel mixture. It may be imagined that such a problem can be solved by simply reducing the cross-sectional area of the first branch intake passage. However, since the first and second branch intake passages are, respectively, connected to the intake ports substantially along the axis of the combustion chamber so as to increase an output of the engine as described above, effective swirling motions of the air-fuel mixture along a circumferential direction of the combustion chamber cannot be produced even if a flow velocity of the air-fuel mixture in the combustion chamber is increased by increasing the flow velocity of the intake gases, thereby resulting in rapid reduction of the flow velocity of the air-fuel mixture in a compression stroke. Meanwhile, in the case where the cross-sectional area of the first branch intake passage is reduced extremely so as to increase the flow velocity of the intake gases as high as possible, a load range usable in the engine is restricted accordingly, so that it becomes necessary to supply the intake gases also from the second branch intake passage by opening the shutter valve even under relatively low load engine operating conditions. At this time, since the two intake ports are formed symmetrically with a horizontal center line of the combustion chamber, the intake gases drawn from the first branch intake passage are caused to collide with those drawn from the second branch intake passage, so that swirling motions of the air-fuel mixture are impaired or almost extinguished and thus, excellent combustibility of the air-fuel mixture based on its vigorous swirling motions cannot be obtained.

SUMMARY OF THE INVENTION

Accordingly, an essential object of the present invention is to provide an intake arrangement for an internal combustion engine provided with an intake construction capable of generating a swirl effective for improving combustibility within a combustion chamber during low load operating conditions of the engine, without substantially altering a two intake port system aiming at a high output of the engine.

Another important object of the present invention is to provide an intake arrangement of the above described type in which a plurality of intake ports are opened in one combustion chamber so as to obtain a large amount of intake gases during high load operating conditions of the engine, thereby to produce a strong swirl within the combustion chamber over a comparatively wide range for low load operating region for achieving a favorable state of combustion.

A further object of the present invention is to provide an intake arrangement of the above described type, which is simple in construction and stable in functioning at high reliability, and can be readily incorporated into various internal combustion engines at low cost.

In accomplishing these and other objects, according to one preferred embodiment of the present invention, there is provided an intake arrangement for an internal combustion engine, which comprises a plurality of intake ports for supplying intake gases, respectively open into each combustion chamber of the internal combustion engine, and intake valves disposed in the respective intake ports, characterized in that there are provided a shutter valve disposed in a main intake passage connected to said plurality of the intake ports, with the shutter valve being adapted to be held in a closed state when intake air amount is small and to be opened when the intake air amount is increased for control to increase or decrease passage area of said main intake passage according to the engine operating conditions, and an auxiliary intake passage branching out from a portion of the main intake passage at an upstream side of said shutter valve so as to be connected to either one of said intake ports and having passage area smaller than that of said main intake passage.

Namely, in the intake arrangement of the present invention as referred to above, intake gases are exclusively supplied from the auxiliary intake passage into the combustion chamber through the intake port connected to the auxiliary intake passage at a high flow velocity under the low load engine operating conditions in which the shutter valve is closed. In this case, since the auxiliary intake passage is formed on the bottom portion of the intake passage, the auxiliary intake passage extends at a small angle with a mating face between the cylinder head and the cylinder block, so that the intake gases drawn into the combustion chamber are swirled in a circumferential direction of the combustion chamber. Furthermore, under the high load engine operating conditions in which the shutter valve is opened, the intake gases are drawn from a plurality of the intake ports into the combustion chamber at a high charging efficiency, so that the engine can positively yield a high output.

Meanwhile, an intake arrangement apparently similar to that of the present invention described so far, is proposed in Japanese Patent Laid-Open Publication No. 25511/1980 (Tokkaisho 55-25511) which discloses an internal combustion engine equipped with a plurality of cylinders each having a combustion chamber formed with two intake ports such that the two intake ports are, respectively, connected to two branch intake passages of a main intake passage. In this known intake arrangement, the two branch intake passages are formed by a partition wall provided adjacent to the combustion chamber. Furthermore, two auxiliary intake passages for obliquely injecting a portion of the intake gases into the combustion chamber are, respectively, provided in the branch intake passages such that outlet ports of the auxiliary intake passages are, respectively, oriented towards opposite portions on an inner face of the cylinder, which opposite portions are substantially symmetrical with the partition wall. Each of the auxiliary intake passages has a cross-sectional area smaller than that of each of the branch intake passages so as to open into each of the intake ports such that the intake gases are drawn from the small auxiliary intake passages into the combustion chamber at a high velocity under low load engine operating conditions. In this known intake arrangement, it is so arranged that the high-speed intake gases drawn from the two outlet ports of the auxiliary intake passages under the low load engine operating conditions produces, through interference therebetween in the vicinity of a spark plug provided at a substantially central portion of the combustion chamber, intense turbulent flow of an air-fuel mixture in the vicinity of the spark plug after having collided with the inner face of the cylinder so as to effect stable combustion of the air-fuel mixture by scavenging around the spark plug effectively and increasing its flame propagation velocity. Consequently, this known intake arrangement is entirely different, in objects, from the intake arrangement of the present invention intended to produce vigorous swirling motions of the air-fuel mixture in the circumferential direction of the combustion chamber.

Therefore, according to the present invention, it becomes possible to improve the combustibility during the low load engine operation, with simultaneous reduction of exhaust emission and fuel cost.

BRIEF DESCRIPTION OF THE DRAWINGS

These and other objects and features of the present invention will become apparent from the following description taken in conjunction with the preferred embodiments thereof with reference to the accompanying drawings, in which:

FIG. 4 is a schematic diagram of a main intake passage and an exhaust passage related to cross sections in FIG. 5;

FIG. 5(1) to 5(9) are cross-sectional views taken along the lines 1 to 9 in FIG. 4, respectively.

DETAILED DESCRIPTION OF THE INVENTION

Figure 1:
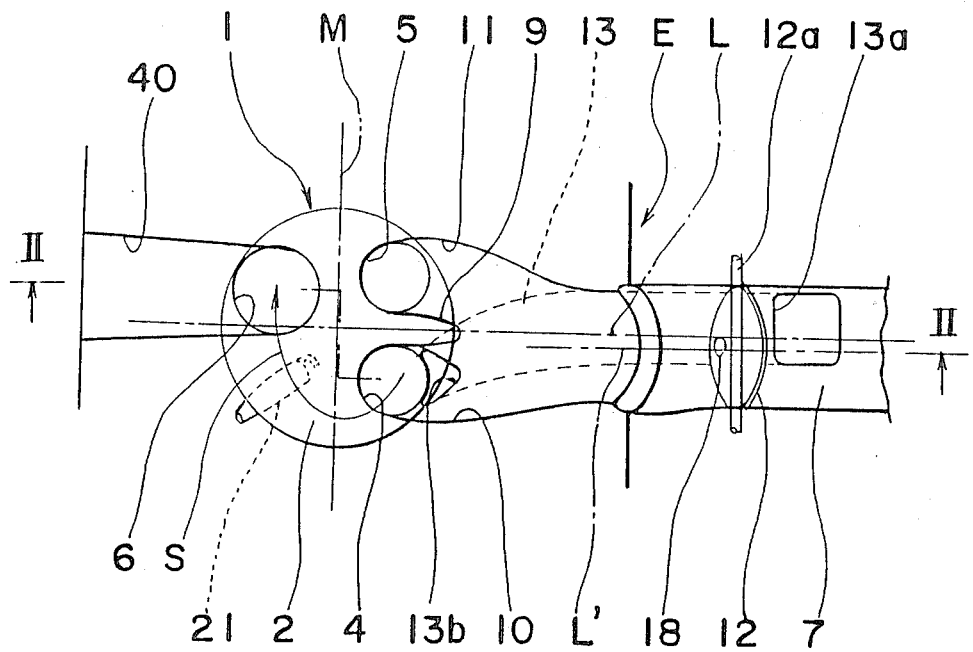
FIG. 1 is a schematic fragmentary top plan view of an intake arrangement for an engine, according to the present invention.

Before the description of the present invention proceeds, it is to be noted that like parts are designated by like reference numerals throughout the accompanying drawings.

Figure 2:
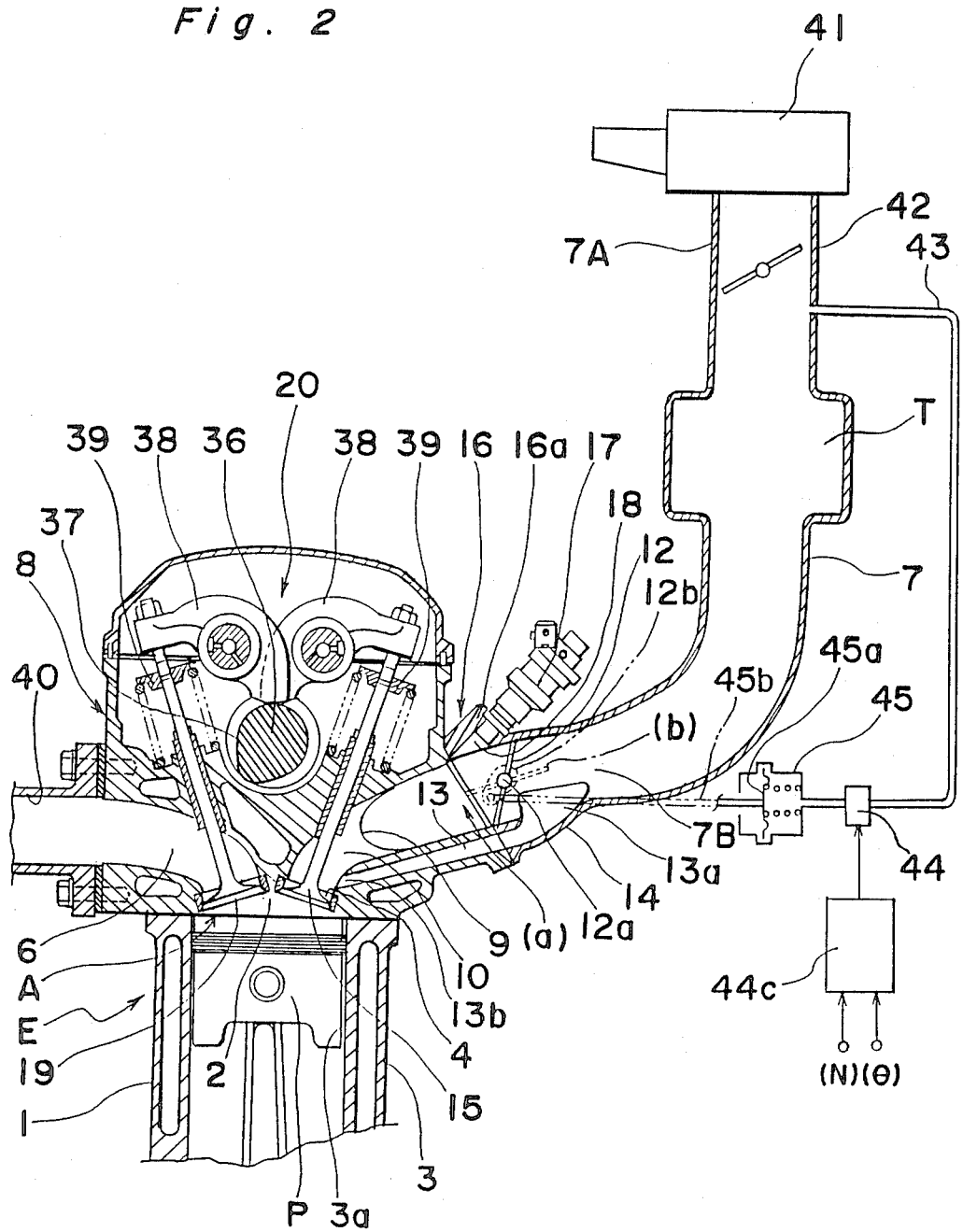
FIG. 2 is a cross-sectional view taken along the line II—II in FIG. 1.

Referring now to the drawings, there is shown in FIGS. 1 and 2, an intake arrangement for an internal combustion engine according to one preferred embodiment of the present invention, which includes a plurality of intake ports 4 and 5 for supplying intake gases, respectively open into each combustion chamber of the internal combustion engine, and intake valves 15 disposed in the respective intake ports 4 and 5, and is characterized in that there are further provided a shutter valve 12 disposed in a main intake passage 7 connected to the plurality of the intake ports 4 and 5 with the shutter valve 12 being adapted to be held in a closed state when intake air amount is small and to be opened when the intake air amount is increased for control to increase or decrease passage area of the main intake passage 7 according to the engine operating conditions, and an auxiliary intake passage 13 branching out from a bottom portion of the main intake passage 7 at an upstream side of the shutter valve 12 so as to be connected to either one of said intake ports 4 and 5 and having passage area smaller than that of the main intake passage 7.

It should be noted here that in the embodiments according to the present invention to be described hereinbelow, although the intake arrangement of the present invention is described with reference to only one cylinder of the internal combustion engine for clarity, it is to be understood that such internal combustion engine includes a plurality of cylinders, to each of which the arrangement of the present invention is applied.

More specifically, as shown in FIGS. 1 and 2, the internal combustion engine E includes a cylinder block 3 (FIG. 2) having cylinder bores 3a formed therein, and a cylinder head 8 (FIG. 2) mounted on the upper portion of the cylinder block 3 to constitute cylinders 1 therebetween, with a piston P being movably accommodated in each of the cylinders bores 3a for reciprocating movements in the axial direction to define the combustion chamber 2 in said cylinder bore 3a.

In the cylinder head 8 for the combustion chamber 2 of each of cylinder bores 3a of the engine E, the first and second intake ports 4 and 5 of approximately the same diameter respectively provided with intake valves 15 are opened in a generally symmetrical relation with respect to a center line L in a widthwise direction of a cylinder block 3 (FIG. 2) of the engine E, while in a position confronting a second intake port 5, with a longitudinal center line M held therebetween, an exhaust port 6 provided with an exhaust valve 19 is opened for communication with an exhaust passage 40 to constitute an exhaust system.

The intake system includes the main intake passage 7 which extends from an air cleaner 41, and includes an upper passage portion 7A provided with a throttle valve 42 between the air cleaner 41 and a surge tank T, and lower passages 7B separated from the surge tank T so as to be led into the respective cylinders 1.

The main intake passage 7 for supplying intake gases into the first and second intake ports 4 and 5 for each cylinder 1 is gradually divided within a cylinder head 8 (FIG. 2), and at a position immediately before the first and second intake ports 4 and 5, is bifurcated by a partition wall 9 formed to project or extend generally along the widthwise direction center line L, with branched intake passages 10 and 11 thus formed being respectively connected to the first and second intake ports 4 and 5. As illustrated in FIG. 1, a center line L' of the intake passage 7 is slightly deviated towards the side of the first intake port 4 with respect to the widthwise direction center line L for a straight connection with the first intake port 4 as compared with the connection with respect to the second intake port 5, with the shutter valve 12 being provided at an upstream side thereof.

The shutter valve 12 is arranged, for example, to be associated with the throttle valve 42 so that it is closed during low load operation where the opening degree of the throttle valve 42 is comparatively small, and opened when the throttle valve 42 is opened beyond a predetermined opening degree.

For controlling the shutter valve 12 for opening and closing, there can be provided a known open/close control mechanism, for example, a link mechanism which is associated with the throttle valve 42, such that the shutter valve 12 is opened when the opening degree of the throttle valve 42 becomes large. In this embodiment, there are provided a negative pressure actuator 45, a three-way magnet valve 44, and a control unit 44c, etc. More specifically, the negative pressure actuator 45 has a diaphragm 45a connected to an arm 12b fixed to a shaft 12a of the shutter valve 12 through a connecting rod 45b, and is communicated with the intake passage 7 at the downstream side of the throttle valve 42 through a pipe line 43 via the three-way magnet valve 44 to which data for the number N of revolutions for the engine (or engine speed) and throttle valve opening degree $\theta$, are applied through the control unit 44c so as to be introduced into the actuator 45, a negative pressure in the close zone, and atmospheric air in the open zone. Thus, the shutter valve 12 is held in a closed state when intake air amount is small and is opened when the intake air amount is increased.

It should be noted here that, although the shutter valve 12 is intended to form a swirl S, such swirl may be produced even if the shutter valve 12 is not completely closed, and therefore, said shutter valve 12 is not necessarily fully closed even in the closed state, but it is possible that said valve 12 is slightly open even at the minimum degree of opening so as to allow air to flow towards the downstream side thereof. The above arrangement is preferable, since the fuel may be rapidly introduced into the cylinder in the case where a fuel injection port 18 to be described later is provided at the downstream side of the shutter valve 12.

Moreover, at the upstream side from the shutter valve 12 of the intake passage 7, an upstream side opening 13a of the auxiliary intake passage 13 is opened in a bottom wall of the intake passage 7 so as to be deviated in position towards the side of the second intake port 5 with respect to the center line L' of the intake passage 7. The auxiliary intake passage 13 referred to above has a downstream side opening 13b open in a position adjacent to the first intake port 4, and is gently curved so as to cross the center line L' of the intake passage 7 for communication of the upstream side opening 13a with the downstream side opening 13b. As specifically shown in FIG. 2, the above auxiliary intake passage 13 is formed in a bottom wall 14 constituting a bottom portion of the intake passage 7, and the downstream side opening 13b thereof is set in a position at a downstream side of the branching point for the bifurcated intake passages 10 and 11 and as close to the first intake port 4 to be opened or closed by the intake valve 15 as possible.

Therefore, the total amount of intake gases flowing down the auxiliary intake passage 13 is to flow into the combustion chamber 2 through the first intake port 4. The auxiliary intake passage 13 intersects with the bifurcated intake passage 10 which is curved at a large radius of curvature in an axial direction of the cylinder 1 at an immediately upstream side of the first intake port 4 in such a manner that said passage 13 forms a small angle of inclination with respect to a mating surface A between the cylinder block 3 and the cylinder head 8, thus being provided with a directivity in a circumferential direction of the combustion chamber 2.

At a slightly downstream side from the upstream side opening 13a *l of the auxiliary intake passage 13, the shutter valve 12 for selective opening or closing of the intake passage 7 is disposed so as to be inclined slantwise downwardly towards the downstream side, while at a fixing portion 16a provided on an upper wall 16 of the intake passage 7 slightly at a downstream side from the shutter valve 12, there is mounted a fuel injector 17. In the above case, the fuel injection port 18 thereof is set in such a position at a slightly downstream side from the rotary shaft 12a of the shutter valve 12 and on the center line L' of the intake passage 7 (FIG. 1). As is well known to those skilled in the art, the fuel jetted by the fuel injector 17 advances straight without spreading up to a certain distance, with a subsequent diffusion in a conical shape. Accordingly, when the fuel injection port 18 is set on the center line L' of the intake passage 7, owing to the fact that the center line L' is preliminarily deviated towards the side of the first intake port 4, a distribution ratio of the fuel diffused in the conical shape with respect to the first and second intake ports tends to be increased at the side of the first intake port 4.

Accordingly, during the low load operation of the engine E in which the intake is exclusively effected through the first intake port 4, a still more amount of fuel is to be mixed with the intake gases for improvement of combustibility of the air-fuel mixture.

Moreover, in the case where the shutter valve 12 is disposed between the upstream side opening 13a of the auxiliary intake passage 13 and the fuel injection port 18 in a posture inclined slantwise downwardly so as to be turned clockwise for opening from a fully closed position (a) shown by a solid line to a fully opened position (b) indicated by a dotted line in FIG. 2, it is possible to reduce a volume of the intake passage at the downstream side of the shutter valve 12 to the minimum during closing of the shutter valve 12. The fuel injector 17 is provided at the upstream side of the partition wall 9 for the first and second intake ports 4 and 5, and can not be disposed at an excessively downstream side, but if the shutter valve 12 required to be installed at the upstream side thereof is provided as described above, said valve 12 can be installed most close to the fuel injector 17, with a minimum space occupied thereby and therefore, the intake passage volume at the downstream side of the shutter valve 12 which becomes a dead volume or wasteful volume during closing of the shutter valve 12 may be reduced to the minimum.

In the above arrangement, since the shutter valve 12 is not necessarily fully closed even in the closed state thereof, with a possibility of opening to a certain extent even at the minimum opening degree for permitting air to flow towards the downstream side thereof as described earlier, the fuel may be rapidly introduced into the cylinder in the case where the fuel injection port 18 is provided at the downstream side of the shutter valve 12. More specifically, in the closed state (closed position) of the shutter valve 12, most of the intake air is led into the cylinder 1 via the auxiliary intake passage 13 through the first intake port 4 so as to form a swirl perpendicular to the axial direction of the cylinder 1 and along the circumferential direction thereof. Meanwhile, a small amount of air flows through a gap between the shutter valve 12 and the wall of the main intake passage 7, and is introduced into the cylinder 1 through both of the first and second intake ports 4 and 5. However, since such air is small in amount, the swirl formed by the auxiliary intake passage 13 may be maintained to be properly strong.

It is to be noted here that the intake valve 15 for opening or closing the first intake port 4, another intake valve 15 (not particularly shown) for opening or closing the second intake port 5 and an exhaust valve 19 for opening or closing an exhaust port 6, are respectively driven for opening and closing at predetermined timings synchronized with rotation of the engine E by a conventional overhead cam driving mechanism 20 provided on the upper portion of the cylinder head 8.

The cam driving mechanism 20 includes a cam shaft 36 driven by a crank shaft (not shown) of the engine E, and a cam 37 formed on said cam shaft 36 and corresponding to the respective intake valves 15 and exhaust valve 19. The cam 37 engages one end of each rocking arm 38 provided to correspond to each of the intake valves 15 and exhaust valve 19, while the other end of the rocking arm 38 contacts each tappet 39 provided on a valve shaft of each of the valves 15 and 19 in a known manner.

Figure 3:
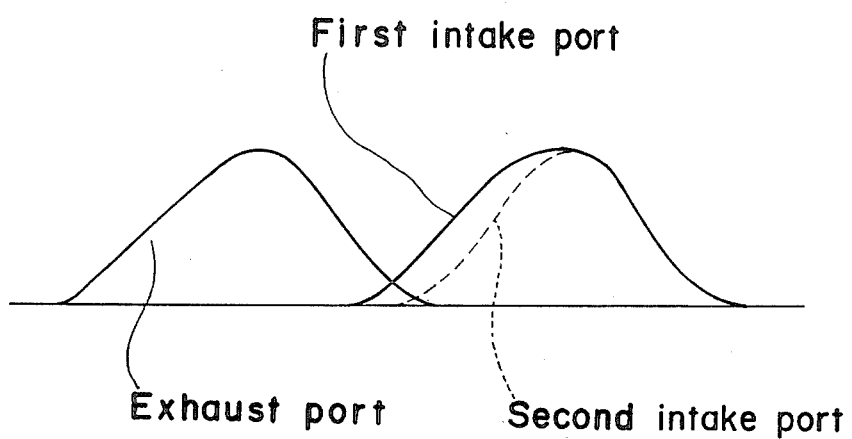
FIG. 3 is a diagram in a graphical form explanatory of a valve opening period for an intake valve in the intake arrangement for an internal combustion engine according to the present invention.

In the engine E according to this embodiment, the intake valve 15 of the first intake port 4 to which the auxiliary intake passage 13 is connected, is arranged to be opened at a timing earlier than the intake valve 15 for the second intake port 5, and to be closed approximately simultaneously with the intake valve 15 for the second intake port 5 as shown in FIG. 3.

Meanwhile, as shown in FIG. 1, a spark plug 21 is disposed at a position where the first and second intake ports 4 and 5 and the exhaust port 6 are not provided, and more specifically, at a position where it confronts the first intake port 4 in which the auxiliary intake passage 13 is opened, with the longitudinal center line M of the combustion chamber 2 held therebetween.

In the disposition of the spark plug 21 as described above, since said spark plug 21 is to be located on a turning locus of the swirl formed by the auxiliary intake passage 13, it is possible to ignite the air-fuel mixture with a favorable ignitability.

Referring to FIGS. 4 and 5, there are shown in FIG. 5 variations of cross sectional shapes of the intake passage 7 with the cylinder head 8 taken along the lines (1) to (9) in FIG. 4 as indicated by the corresponding numbers in FIG. 5.

As shown in FIG. 5, the cross section shape of the intake passage 7 which is circular at first varies from an elliptic shape to a shape as in a figure eight towards the downstream side, and is then divided into the bifurcated intake passages 10 and 11 having two circular cross sections. The auxiliary intake passage 13 located below the main intake passage 7 and having a flat rectangular cross section, with a sufficiently small passage cross sectional area as compared with the passage cross section area of the intake passage 7, is gradually displaced from an initial position deviated towards the second intake port 5 in the main intake passage 7 (i.e., towards the right in FIG. 5) to a position at the side of the first intake port 4 (at the left side in FIG. 5) so as to cross the bottom wall of the bifurcated intake passage 10 connected to the first intake port 4 to finally open at the immediate upstream side of the first intake port 4.

As shown in FIGS. 1 and 2, the auxiliary intake passage 13 formed in the bottom wall 14 constituting the bottom face of the main intake passage 7, is provided to make a comparatively small angle of inclination with respect to the mating surfaces A between the cylinder block 3 and the cylinder head 8, and as viewed from the top, is smoothly curved to cross the first intake port 4 from the side of the second intake port 5. Accordingly, particularly during the low load operation of the engine E in which the shutter valve 12 is totally closed, the intake gases flowing down exclusively through the auxiliary intake passage 13 increase its velocity by being passed through the narrow passage and flows into the combustion chamber 2 through the first intake port 4 while being directed towards the circumferential direction of the combustion chamber 2 thus generating a swirl in the circumferential direction within the combustion chamber 2.

Since the swirl referred to above is formed in the circumferential direction of the combustion chamber 2, it is not readily attenuated or dampened, and is favorably ignited for combustion by the ignition of the spark plug 21 at the last stage of a compression stroke.

In the above case, since the intake valve 15 for the first intake port 4 is arranged to be opened at the timing earlier than the opening of the intake valve 15 for the second intake port 5 as stated previously with reference to FIG. 3, when the intake valve 15 for the first intake port 4 is opened, the intake gases staying in the main intake passage 7 at the downstream side of the shutter valve 12 and in the first and second bifurcated intake passages 10 and 11 are drawn into the combustion chamber 2 together with the intake gases from the auxiliary intake passage 13. Accordingly, the amount of intake gases from the first intake port immediately after opening of the valve is increased for strengthening of the swirl within the combustion chamber 2.

It should be noted here that in the foregoing embodiment, although it is so arranged that the main intake passage 7 is branched at the downstream side of the shutter valve 12, with the auxiliary intake passage 13 adapted to cross the first intake port side from the second intake port side, the present invention is not limited, in its application, to such arrangement, but may be further modified in various ways within the scope.

Figure 6:
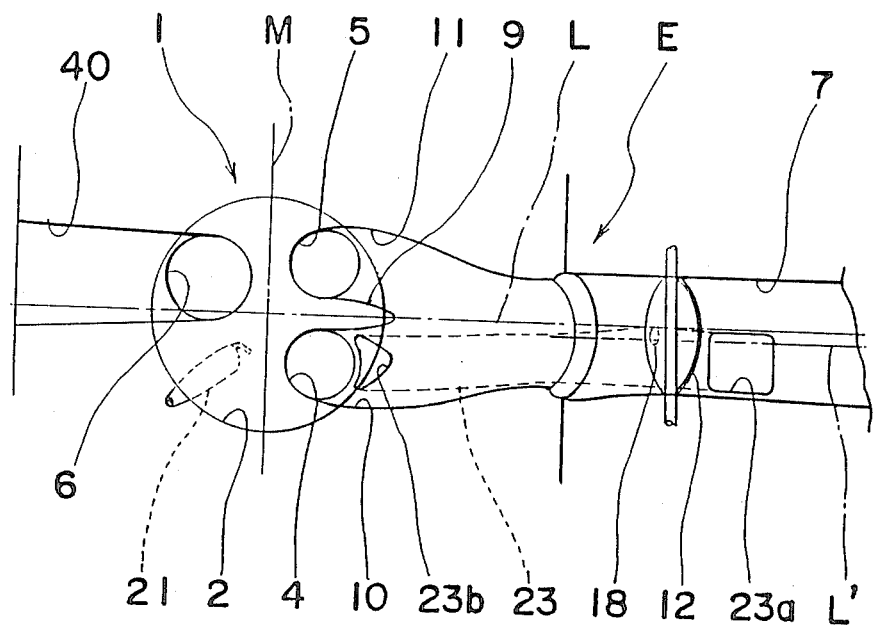
FIGS. 6 through 8 are views similar to FIG. 1, which particularly show modifications thereof.

For example, as shown in FIG. 6, it may be so modified that the auxiliary intake passage 23 is formed straight along an extension line of the bifurcated intake passage 10 connected to the first intake port 4, with an upstream side opening 23a thereof being opened in the bottom wall of the intake passage 7 at the upstream side of the shutter valve 12, and a downstream side opening 23b thereof opened in the position adjacent to the first intake port 4.

Figure 7:
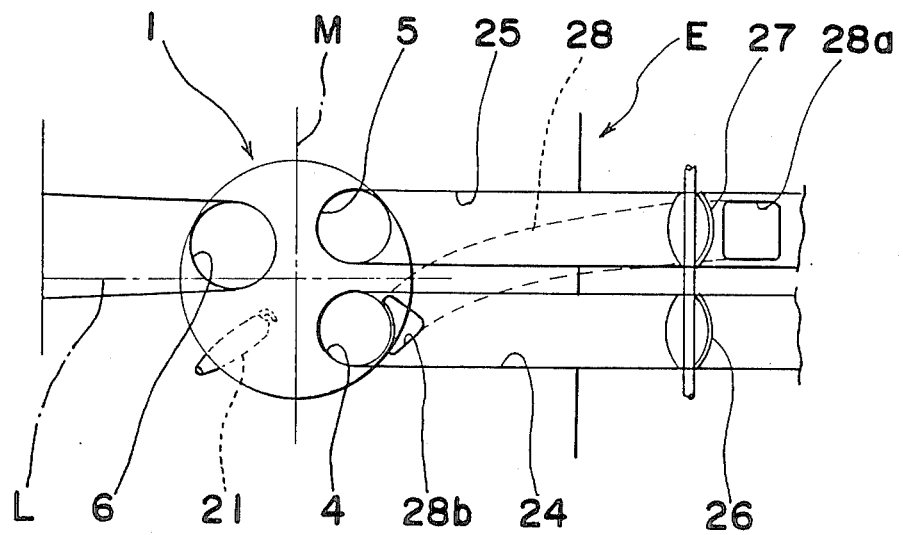
Figure 8:
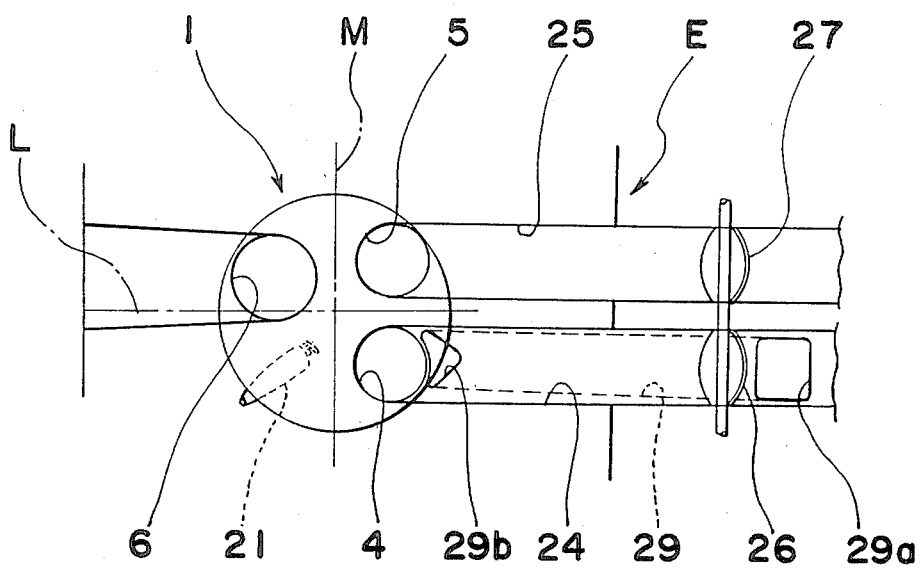

Furthermore, the present invention may also be applied, for example, to an intake passage arrangement as shown in FIGS. 7 and 8 in which bifurcated intake passages 24 and 25 respectively connected to the first and second intake ports 4 and 5 are formed to be independent up to the side of an intake manifold (not shown) at the upstream side of the cylinder head 8, with shutter valves 26 and 27 associated in movements being provided in the respective intake passages 26 and 27.

In the above case, as shown in FIG. 7, an auxiliary intake passage 28 may be formed to cross the side of the first intake port 4 from the upstream side of the shutter valve 27 where the upstream side opening 28a thereof is formed, with the downstream side opening 28b being opened in the position adjacent to the intake port 4. Similarly, as shown in FIG. 8, an auxiliary intake passage 29 may be provided to extend straight from the upstream side of the shutter valve 26 where the upstream side opening 29a thereof is formed, to the first intake port 4 for connection thereto, with a downstream side opening 29b being formed in the position adjacent to the intake port 4.

In the modifications of FIGS. 6 through 8, like parts in FIG. 1 are designated by like reference numerals, with detailed description thereof abbreviated here for brevity.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An intake arrangement for an internal combustion engine, comprising first and second intake ports for supplying intake gases, said first and second intake ports respectively open into a combustion chamber of the internal combustion engine, said combustion chamber including a cylinder having an axial and a lateral direction, and intake valves disposed in the respective intake ports, a main intake passage in communication with said intake ports for supplying said intake gases to said combustion chamber, said main intake passage having a lower lower portion curved to a large extent in the axial direction in the vicinity of said ports, a shutter valve means provided in said main intake passage, said shutter valve means being adapted to be held in a closed state when intake air amount is small and to be opened when the intake air amount is increased for control to increase or decrease passage area of said main intake passage according to the engine operating conditions, a throttle valve in said main intake passage upstream of said shutter valve with respect to the direction of flow of gases towards the combustion chamber, and means for causing a swirling flow of gases in a circumferential direction of said combustion chamber comprising a single auxiliary intake passage having an upstream end opening into the main intake passage at a location upstream of the shutter valve means and downstream of said throttle valve, and also having a downstream end opening only adjacent the first intake port, the downstream end being displaced relative to the center of the combustion chamber, said auxiliary intake passage being formed so as to be directionally below said main intake passage from the upstream end to the downstream end of the auxiliary intake passage, the upstream end and the downstream end being continuously smoothly connected so that the auxiliary passage is curved to be adjacent a peripheral edge of the cylinder, a longitudinal cross-section of the auxiliary intake passage between the upstream end and the downstream end being a substantially straight line, a portion of said auxiliary intake passage adjacent said combustion chamber intersecting the curved portion of said main intake passage adjacent said first intake port.

2. An intake arrangement as claimed in claim 1, further including a intake valve operating device for controlling opening and closing of said intake valves in such a manner that the intake valve for opening or closing the intake port to which the auxiliary intake passage is connected is opened earlier than other valves in the same combustion chamber at the same intake stroke.

3. An intake arrangement as claimed in claim 1, wherein a spark plug is provided at the side of the intake port to which the auxiliary intake passage is connected.

4. An intake arrangement as claimed in claim 1, wherein said main intake passage is divided into bifurcated intake passages by a partition wall at a position before the first and second intake ports so as to be respectively connected to said first and second intake ports, with a shutter valve for said shutter valve means being provided at an upstream side thereof, said main intake passage having an upstream side opening for said auxiliary intake passage, formed in a bottom wall of said main intake passage in a position at an upstream side of said shutter valve and deviated towards the side of said second intake port with respect to a center line of said main intake passage and a downstream side opening opened adjacent to said first intake port, said auxiliary intake passage extending to cross said center line for communication of said upstream side opening with said downstream side opening.

5. An intake arrangement as claimed in claim 1, wherein said main intake passage is divided into bifurcated intake passages by a partition wall at a position before the first and second intake ports so as to be respectively connected to said first and second intake ports, with a shutter valve for said shutter valve means being provided at an upstream side thereof, said main intake passage having an upstream side opening for the auxiliary intake passage, formed in a bottom wall of said main intake passage in a position at an upstream side of said shutter valve and at the side of said first intake port and a downstream side opening opened adjacent to said first intake port, said auxiliary intake passage extending straight along an extension line of the bifurcated intake passage 10 for communication of said upstream side opening with said downstream side opening.

6. An intake arrangement for an internal combustion engine, comprising first and second intake ports for supplying intake gases, respectively into a combustion chamber of the internal combustion engine, said combustion chamber including a cylinder having an axial and a lateral direction, and intake valves disposed in the respective intake ports, a main intake passage for said combustion chamber, said main intake passage having a lower portion curved to a large extent in said axial direction in the vicinity of said ports, a shutter valve means provided in said main intake passage, said main intake passage connected to said plurality of the intake ports, said shutter valve means being adapted to be held in a closed state when intake air amount is small and to be opened when the intake air amount is increased for control to increase or decrease passage area of said main intake passage according to the engine operating conditions, a fuel injection nozzle in said main intake passage downstream of said shutter valve, and means for causing a swirling flow of gases in a circumferential direction of the combustion chamber comprising a single auxiliary intake passage having an upstream end opening into the main intake passage at a location upstream of the shutter valve means with respect to the direction of flow of the gases towards the combustion chamber, and also having a downstream end opening only adjacent the first intake port, the downstream end being displaced relative to the center of the combustion chamber, and wherein the auxiliary intake passage has a flat rectangular cross-section in said lateral direction of said cylinder, said passage extending below and along the main intake passage and opening adjacent the first intake port at a smaller angle of inclination than that of the main intake passage, the upstream end and the downstream end being continuously smoothly connected so that the auxiliary passage is curved to be adjacent a peripheral edge of the cylinder, a longitudinal cross-section of the auxiliary intake passage between the upstream end and the downstream end being a substantially straight line.

7. An intake arrangement as claimed in claim 6, wherein the engine is a multicylinder engine and both of the auxiliary intake port and the shutter valve are employed for each of the combustion chambers.

8. An intake arrangement as claimed in claim 6, wherein the auxiliary intake passage has its cross-sectional area gradually reduced only in the horizontal direction in a direction towards the downstream side thereof.

9. An intake arrangement as claimed in claim 8, wherein a spark plug is provided at the side of the intake port to which the auxiliary intake passage is connected.

10. An intake arrangement for an internal combustion engine, comprising first and second intake ports for supplying intake gases, respectively into a combustion chamber of the internal combustion engine, said combustion chamber including a cylinder having an axial and a lateral direction, and intake valves disposed in the respective intake ports, a shutter valve means provided in a main intake passage, said main intake passage connected to said plurality of the intake ports, said shutter valve means being adapted to be held in a closed state when intake air amount is small and to be opened when the intake air amount is increased for control to increase or decrease passage area of said main intake passage according to the engine operating conditions, a fuel injection nozzle in said main intake passage downstream of said shutter valve means and means for causing a swirling flow of gases in a circumferential direction of said combustion chamber comprising a single auxiliary intake passage having a flat rectangular cross-section in said lateral direction of said cylinder and extending below and along the main intake passage, the width of the auxiliary passage in said lateral direction being substantially less than the width of the main intake passsage but at least as great as one-half the diameter of said first intake port, said auxiliary intake passage having an upstream end opening into the main intake passage at a location upstream of the shutter valve means and displaced relative to the center of the combustion chamber on the side of the second intake port and having a downstream end opening adjacent the first intake port, said downstream end being displaced relative to the center of the combustion chamber on the side of the first intake port, the upstream end and the downstream end being continuously smoothly connected so that the auxiliary passage is curved to be adjacent a peripheral edge of the cylinder, a longitudinal cross-section of the auxiliary intake passage between the upstream end and the downstream end being a substantially straight line, said fuel injection nozzle being disposed so that a larger amount of fuel is supplied to said first intake port than to said second intake port.

11. An intake arrangement for an internal combustion engine, comprising first and second intake ports for supplying intake gases, respectively into a combustion chamber of the internal combustion engine, and intake valves disposed in the respective intake ports, shutter valve means provided in a main intake passage, said main intake passage connected to said plurality of the intake ports, said shutter valve means being adapted to be held in a closed state when intake air amount is small and to be opened when the intake air amount is increased for control to increase or decrease passage area of said main intake passage according to the engine operating conditions, means for causing a swirling flow of gases in a circumferential direction of the combustion chamber comprising a single auxiliary intake passage having an upstream end opening into the main intake passage at a location upstream of the shutter valve means with respect to the direction of flow of the gases towards the combustion chamber, and also having a downstream end opening only adjacent the first intake port, the downstream end being displaced relative to the center of the combustion chamber and, an intake valve operating means for controlling opening and closing of said intake valves in such a manner that the intake valve for opening or closing the first intake port to which the auxiliary intake passage is connected is opened earlier than other valves in the same combustion chamber at the same intake stroke, the auxiliary passage being formed so as to be directionally below said main intake passage from the upstream end to the downstream end of the auxiliary intake passage, the upstream end and the downstream end being continuously smoothly connected so that the auxiliary passage is curved to be adjacent a peripheral edge of the cylinder, a longitudinal cross-section of the auxiliary intake passage between the upstream end and the downstream end being a substantially straight line.

12. An intake arrangement for an internal combustion engine, which comprises first and second intake ports for supplying intake gases, respectively into each combustion chamber of the internal combustion engine, and intake valves disposed in the respective intake ports, a shutter valve means provided in a main intake passage, said main intake passage connected to said first and second intake ports of each combustion chamber, said shutter valve means being adapted to be held in a closed state when intake air amount is small and to be opened when the intake air amount is increased for control to increase or decrease passage area of said main intake passage according to the engine operating conditions, means for causing a swirling flow of gases in a circumferential direction of the associated combustion chamber comprising a single auxiliary intake passage having an upstream end opening into the main intake passage at a location upstream of the shutter valve means with respect to the direction of flow of the gases towards the combustion chamber, and also having a downstream end opening only adjacent the first intake port, the downstream end being displaced relative to the center of the combustion chamber and wherein said main intake passage includes independent branched passages communicating therewith at an upstream side of the shutter valve means, and respectively connected to said first and second intake ports, said shutter valve means includes shutter valves associated with each other and respectively provided in said independent branched passages, one of said independent branched passages having the upstream end of the auxiliary intake passage formed in a bottom wall of said one independent branched passage for said second intake port and in a position at an upstream side of said respective shutter valve, the auxiliary intake passage having the downstream end opening in the other independent branched passage adjacent to said first intake port and in a position downstream of the respective shutter value, said auxiliary intake passage extending to cross said branched passages towards said first intake port for communication of said upstream end with said downstrem end, a throttle valve located upstream of said shutter valves, and the upstream end of said auxiliary intake passage being downstream of said throttle valves.

13. An intake arrangement for an internal combustion engine, comprising first and second intake ports for supplying intake gases, said first and second intake ports respectively open into a combustion chamber of the internal combustion engine, said combustion chamber including a cylinder having an axial and a lateral direction, and intake valves disposed in the respective intake ports, a main intake passage in communication with said intake ports for supplying said intake gases to said combustion chamber, said main intake passage having a lower portion curved to a large extent in the axial direction in the vicinity of said ports, a shutter valve means provided in said main intake passage, said shutter valve means being adapted to be held in a closed state when intake air is of a small amount and to be opened when intake air is to be increased in amount for control to increase or decrease passage area of said main intake passage according to the engine operating conditions, a throttle valve in said main intake passage upstream of said shutter valve with respect to the direction of flow of gases toward the combustion chamber, a fuel injection nozzle in said main intake passage downstream of said shutter valve means, and means for causing a swirling flow of gases in a circumferential direction of said combustion chamber comprising a single auxiliary intake passage having an upstream end opening into the main intake passage at a location upstream of the shutter valve means and downstream of said throttle valve, and also having a downstream end opening only adjacent the first intake port, the downstream end being displaced relative to the center of the combustion chamber, said auxiliary intake passage being formed so as to be directionally below said main intake passage from the upstream end to the downstream end of the auxiliary intake passage, the upstream end and the downstream end being continuously smoothly connected so that the auxiliary passage is curved via adjacent a peripheral edge of the cylinder, a longitudinal cross-section of the auxiliary intake passage between the upstream end and the downstream end being a substantially straight line, the injector and the shutter valve being disposed adjacent to each other.

14. An intake passage arrangement of the type claimed in claim 13 wherein a ratio of fuel provided by the fuel injector is larger in the auxiliary passage.

15. An intake arrangement for an internal combustion engine of the type set forth in claim 13 wherein the shutter valve is inclined with respect to the main intake passage so that a lower portion of the shutter valve is inclined toward the downstream side.

16. An intake arrangement for an internal combustion engine comprising first and second intake ports for supplying intake gases, said first and second intake ports respectively open into a combustion chamber of the internal combustion engine, said combustion chamber including a cylinder having an axial and a lateral direction, an intake valve disposed in the respective intake ports, a main intake passage in communication with said intake ports for supplying said intake gases to said combustion chamber, said main intake passage having a lower portion curved to a large extent in the axial direction in the vicinity of said ports, a shutter valve means provided in said main intake passage, said shutter valve means being adapted to be held in a closed state when an amount of intake air is small and to be opened when an amount of intake air is increased for control to increase or decrease passage area of said main intake passage according to the engine operating conditions, a throttle valve in said main intake passage upstream of said shutter valve with respect to the direction of flow of gases towards the combustion chamber, a fuel injection nozzle in said main intake passage downstream of said shutter valve means, and means for causing a swirling flow of gases in a circumferential direction of said combustion chamber comprising a single auxiliary intake passage having an upstream end opening into the main intake passage at a location upstream of the shutter valve means and downstream of said throttle valve, and also having a downstream end opening only adjacent the first intake port, the downstream end being displaced relative to the center of the combustion chamber, said auxiliary intake passage being formed so as to be directionally below said main intake passage from the upstream end to the downstream end of the auxiliary intake passage, the upstream end and the downstream end being continually, smoothly connected so that the auxilliary passage is adjacent a peripheral edge of the cylinder, a longitudinal cross-section of the auxiliary intake passage between the upstream end and the downstream end being a substantially straight line, a portion of said auxiliary intake passage adjacent said combustion chamber intersecting the curved portion of said main intake passage adjacent said first intake port, said main intake passage including independent branched passages communicating therewith at an upstream side of the cylinder head, and respectively connected to said first and second intake ports, said shutter valve means including shutter valves associated with each other and respectively provided in said independent branched passages, one of said independent branched passages having the upstream end of the auxiliary intake passage formed in a bottom wall of said one independent branched passage for said first intake port and in a position at an upstream side of said shutter valve, the auxiliary intake passage having the downstream end opening in the same independent branched passage adjacent to said first intake port.

* * * * *